United States Patent

[11] 3,581,793

| [72] | Inventor | Hermann Wittneben |
| | | Hannover, Germany |
| [21] | Appl. No. | 784,012 |
| [22] | Filed | Dec. 16, 1968 |
| [45] | Patented | June 1, 1971 |
| [73] | Assignee | Continental Gummi-Werke Aktiengesellschaft Hannover, Germany |
| [32] | Priority | Dec. 15, 1967 |
| [33] | | Germany |
| [31] | | P 16 05 642.1 |

[54] PNEUMATIC VEHICLE TIRE
8 Claims, 4 Drawing Figs.

[52] U.S. Cl. ................................................. 152/354, 152/356, 152/361
[51] Int. Cl. ....................................................... B60c 9/10, B60c 9/20
[50] Field of Search ........................................ 152/354, 356, 361

[56] References Cited
UNITED STATES PATENTS

| 3,414,447 | 12/1968 | Travers | 156/131 |
| 3,175,598 | 3/1965 | Cegnar | 152/361 |
| 3,339,610 | 9/1967 | Fausti et al. | 152/354 |

FOREIGN PATENTS

| 1,303,287 | 7/1962 | France | 152/361 |

*Primary Examiner*—Drayton E. Hoffman
*Attorney*—Walter Becker

ABSTRACT: A pneumatic vehicle tire having a tread strip and being provided with a pull-resistant belt extending substantially over the width of the tread strip and comprising pull-resistant strength members forming an acute angle with the circumferential direction of the tire, said tire also comprising a carcass with strength members extending into the vicinity of said belt, those portions of said carcass strength members which are adjacent said belt being at least locally undulated.

PATENTED JUN 1 1971

3,581,793

INVENTOR
HERMANN WITTNEBEN

BY

PNEUMATIC VEHICLE TIRE

The present invention relates to a pneumatic vehicle tire with a pull-resistant belt provided within the tread strip zone and extending substantially over the width of said tread strip. The said belt comprises parallel pull-resistant strength members such as threads, wires, cords, or the like, which form an acute angle with the circumferential direction of the tire. The pneumatic vehicle tire according to the invention also comprises a carcass with strength members which are anchored in the tire beads and either extend uninterruptedly from bead to bead or overlap each other at an area, for instance, below the tread strip.

With heretofore known pneumatic tires of the above-mentioned type, the strength members of the carcass extend rectilinearly or are straightened out in the area of the tire sidewalls as well as in the area adjacent to the belt. In view of the pull resistance of said strength members, it will be assured that during the operation of the tire the width of the crosswise located strength members of the belt cannot be enlarged.

The present invention is based on the finding that it is advantageous under special, mostly unusual conditions of operations, if, particularly when radial forces act upon the tread strip, an increased push elasticity may occur in view of a certain elastic transverse expansion of the tread strip zone of the pneumatic tire.

Accordingly, it is an object of the present invention so to improve tires of the above-mentioned type that an enlarged push elasticity of the tire body will be assured. This object and other objects and advantages of the invention will appear more clearly from the following specification in connection with the accompanying drawing, in which:

FIG. 1 illustrates a partial section through a pneumatic tire which is under no load, but is under the pressure of operation.

FIG. 2 diagrammatically illustrates the reinforcing insert layers of the tire according to FIG. 1 which for purposes of a simpler illustration are considered to be located in the drawing plane.

Figure 1:
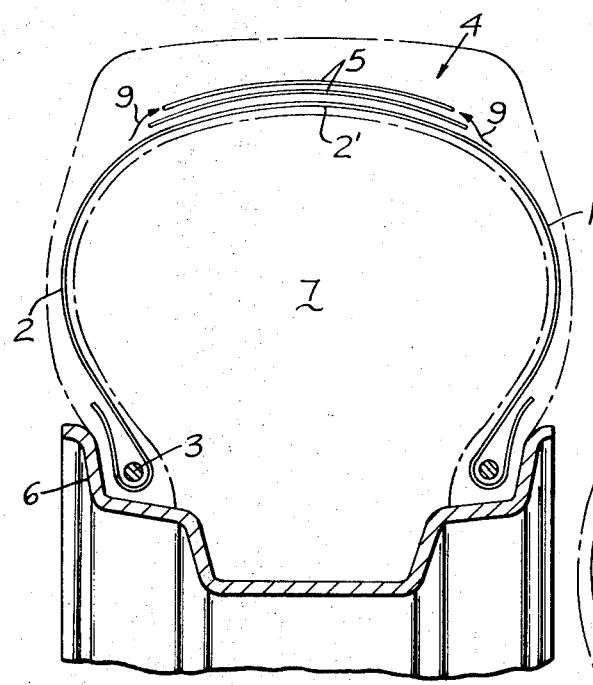

The pneumatic vehicle tire according to the present invention is characterized primarily in that those strength member sections of the carcass which are adjacent to the belt have at least some undulated portions. Preferably, the strength members of the carcass are so arranged that the amplitude of the undulations increases from the marginal areas of the belt to the middle of the tire. Advantageously, the strength member sections which are adjacent to the marginal areas of the belt extend in straightened-out condition.

While those strength member sections of the carcass which face the marginal areas of the belt assure the connection necessary for maintaining the strength between the belt on one hand and the strength sections in the tire sidewalls on the other hand, the carcass strength sections or portions which are directly below the belt are adapted under the influence of pushing forces to straighten out or to deform in view of a widening of the belt; the carcass strength portions and also the belt strength portions thereabove return to their original position when the push stresses subdivide.

Referring now to the drawing in detail, the tire carcass 1 primarily comprises pull-resistant cord threads 2 which extend at a substantially right angle with regard to the circumferential direction of the tire and which, while being looped around the bead cores 3, are anchored thereto and uninterruptedly extend from bead to bead. The belt 4 surrounds the carcass 1 in the form of an annular band having a flat rectangular cross section. The belt 4 comprises two or more layers 5 of parallel pull-resistant strength members which form angles of approximately from 10 to 25° with the circumferential direction of the tire while the strength members of the layers 5 are parallel in each layer, but cross the strength members of the respective adjacent layers 5 so as to form a symmetric cross connection.

The tire is shown as being mounted on a rim 6. The hollow chamber 7 is under an overpressure of, for instance, two atmospheres above atmospheric pressure.

Figure 3:
FIG. 3 shows the course of a carcass thread in the tread strip zone.

Within the region of the tire sidewalls and the marginal areas R of the belt, the cord threads 2 extend for all practical purposes in straightened out condition whereas therebetween they are undulated in such a way that the amplitude of the undulation increases toward the central portion of the belt while the length of the waves or undulations decreases toward the central portion of the belt. These waves or undulations are located in planes which are parallel or practically parallel to the respective adjacent portions of the tire inner surface. For reasons of clearer illustration only, the undulation is shown in FIG. 3 on a largely increased scale. With actual tires, the maximum amplitude amounts to from one to three times the thickness of the respective strength member. This amplitude may be somewhat greater when the density of the strength members is less.

The thread portions 2' of the cord threads 2, which thread portions are located between the two marginal areas R of the belt have, when in condition of operation as shown in FIG. 1, the shape indicated more clearly in FIG. 3. Nevertheless, the strength of the tire reinforcement is assured in the condition of operation according to FIG. 1. The forces to be conveyed to the belt 4 by the cord threads 2 in the tire sidewalls are conveyed by the overlapping within the region of the marginal areas R of the belt. This is indicated by the arrows 9. The thread portions 2' pertaining to the cord threads 2 and located between the two marginal areas R of the belt are, for all practical purposes, under no tension.

When strong radial shocks occur, or the tire is under shock load, a slight elastic increase in the width of the tread strip zone with a widening of the belt 4 will occur while the widening or broadening in the direction of the width of the belt 4 will be possible because the strength members forming the belt are arranged in cross connection and a change in the angle is possible in the manner of a Nurnberg scissors. With this change in the width, the undulated portions 2' of the cord threads 2 are stressed inasmuch as they are more or less stretched. The amplitude may be reduced while the undulated shape is maintained. However, it is possible to eliminate the undulated shape completely so that the cord thread portions 2' will then be completely straightened-out during the shock load. When the shock load subsides, a transverse contraction occurs and the cord threads 2 of the carcass 1 again assume the shape they have in FIG. 3.

Figure 4:
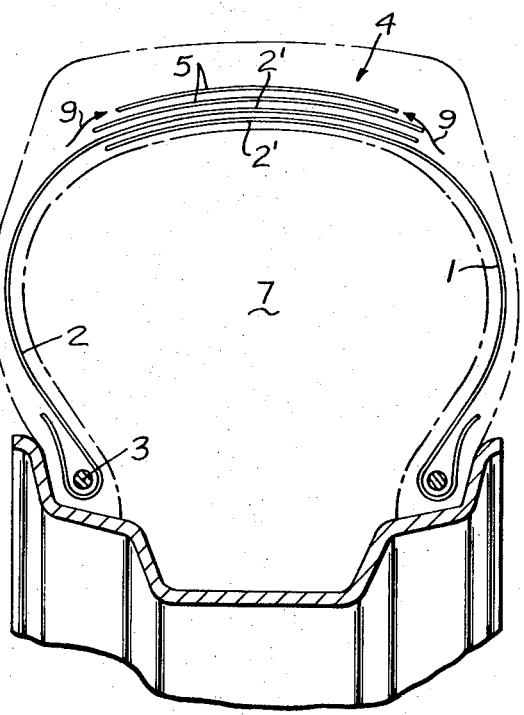
FIG. 4 illustrates a partial section through a pneumatic tire in which overlapping carcass thread is provided radially inwardly of a belt and tread strip zone.
Figure 2:
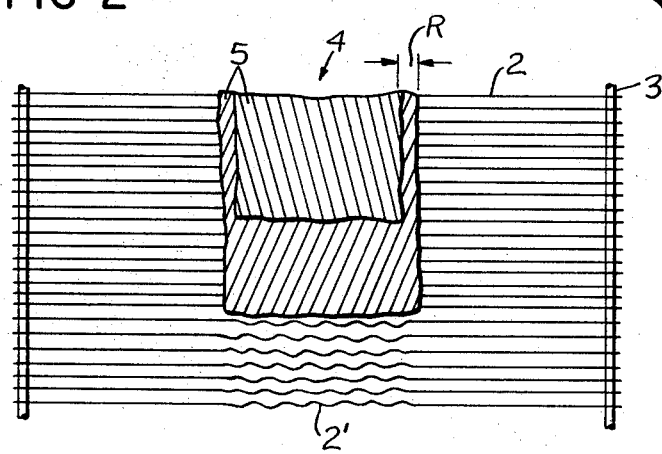

It may be mentioned that it is not under all circumstances necessary that the cord threads 2 extend in one piece from bead to bead. If desired, the cord threads 2 may be composed of two or more portions, but in such an instance, the interconnection of these portions must be assured by a sufficiently long overlapping of the adjacent marginal area of said portions represented in FIG. 4 of the drawings.

It is, of course, to be understood that the present invention is, by no means, limited to the particular showing in the drawing, but also comprises modifications within the scope of the appended claims.

What I claim is:

1. A pneumatic vehicle tire having a tread strip and being provided with a pull-resistant belt extending substantially over the width of the tread strip and comprising pull-resistant strength members forming an acute angle with the circumferential direction of the tire, said tire also comprising a carcass with strength members extending into the vicinity of said belt, all those portions of said carcass strength members which are adjacent said belt being at least locally undulated and free of stress, the amplitude of the locally undulated portions of said carcass strength member increasing in the direction from the marginal regions of said belt respectively of the central tire portion thereof.

2. A tire according to claim 1, in which only the carcass strength member portions which are outwardly adjacent the marginal regions of said belt are in substantially straightened-out condition to extend rectilinearly.

3. A tire according to claim 1, in which those locally undulated carcass strength member portions which are radially inward in the vicinity of the central area of said belt have the largest amplitude.

4. A tire according to claim 3, in which the largest amplitude equals approximately in a range from one to three times the thickness gauge of any of the carcass strength members.

5. A tire according to claim 1, in which the wave length of the locally undulated portions of said carcass strength member decreases from the outward marginal areas of said belt inwardly to the central portion thereof.

6. A tire according to claim 1, in which the waves of said undulated portions increasing impact elasticity of said carcass strength members are all substantially parallel to the immediately adjacent portions of the tire inner surface.

7. A tire according to claim 1 which is provided with laterally spaced annular beads, and in which the strength members of the carcass are anchored radially to said beads and extend in uninterrupted manner from bead to bead.

8. A tire according to claim 1 which is provided with laterally spaced annular beads, and in which the carcass strength members comprise first radial portions respectively extending from the beads to the shoulder portion of the tire and second undulated portions extending from one shoulder portion to the other shoulder portion while overlapping with the adjacent ends of the respective adjacent first portions of said carcass strength members.